United States Patent Office 3,208,824
Patented Sept. 28, 1965

3,208,824
PROCESS FOR THE CONTINUOUS PRODUCTION OF BORON NITRIDE
Alfred Lipp, Kempten-Neudorf, Germany, assignor to Elektroschmelzwerk Kempten G.m.b.H., Munich, Germany
No Drawing. Filed June 4, 1962, Ser. No. 199,592
Claims priority, application Germany, Aug. 11, 1961, E 21,518; May 4, 1962, E 22,833
10 Claims. (Cl. 23—191)

This invention relates to a process for the production of boron nitride, particularly to a continuous process, and even more particularly to a process employing an oxygen-containing boron compound such as boric acid as the raw material source of boron.

In the chemical literature, there are disclosed batch processes for producing boron nitride by reacting ammonia at high temperatures with either a mixture of boric acid and calcium phosphate, or boric acid and boron nitride, the calcium phosphate and boron nitride in both cases functioning merely as a diluent. These processes, however, require exceptionally long reaction times, for example, 9 hours as disclosed in Austrian Patent 192,319. Consequently, if one were to employ these processes commercially, a large investment in equipment would be required in order to provide a significant production. Furthermore, the inordinately long reaction times necessitate higher energy costs for heating, and significant labor costs for start-up, shut-down, and clean-up operations. Still further, due to these long reaction times, a continuous process has not even been considered in view of the highly expensive process equipment that would be entailed in converting from a batch to continuous operation.

An object of this invention, therefore, is to provide a process having a comparatively short reaction time.

Another object is to provide a continuous process, thereby eliminating the additional costs inherent in a batch operation.

Still other objects and advantages of the present invention will become apparent upon further study of the specification and appended claims.

To accomplish the objects of this invention, a process has been discovered which comprises:

(1) Introducing, preferably continuously, particles comprising an oxygen containing boron compound and a solid diluent, said particles having a maximum thickness of about 20 mm., to a partial nitriding zone in contact with ammonia for at least 10 minutes at 500–900° C., and (2) Introducing, preferably continuously, the partially nitrided particles to a final nitriding zone in contact with an excess of ammonia at above 900° C. for a period of time approximately equal to or less than the residence time of the particles in the partial nitriding zone.

The oxygen-containing boron compounds which are employed as a raw material source of boron are preferably $B_2O_3$, $H_3BO_3$, alkali (eg., Na, K) and alkaline earth (eg., Ca, Mg) borates. Of course, other oxygen-containing boron compounds can be used, but they would be more expensive than the preferred compounds.

As the solid diluent which is substantially intimately and homogenously mixed with the boron compound, it is necessary to employ one that is inert to the chemicals, atmosphere, and reaction conditions employed in the nitriding steps. Furthermore, the diluent must be high melting, i.e., above about 1300° C., exhibit a high volume to weight ratio, above about 0.2 g./ml., which means that it should have a piled density of less than 200 g./l., and it must also be capable of being separated from boron nitride by washing techniques and the like. Of the various diluents that can be utilized in this invention, the most preferred is tricalcium phosphate. Other preferred diluents include $MgF_2$, $Mg_2P_2O_7$, $CaF_2$, $Ba_3(PO_4)_2$, and $BaF_2$.

The weight ratio of the boron containing compound, based on boron oxide, to the diluent is about 1:2 to 1:1 respectively, the preferred ratio being 1:1.5.

To form the particles of the boron-containing compound and diluent, both materials are admixed with an inert, low-boiling liquid, such as water, to yield a mass having a pasty consistency. The pasty mass is then extruded, molded or granulated into small particles which are subsequently dried at a temperature sufficient to drive off the volatile liquid, (e.g., 150–250° C.).

The size of these small particles is a feature of this invention, inasmuch as it has been discovered that there is a rapid decrease in the overall rate of reaction when the thickness of the particles exceed 20 mm. under the reaction conditions of this invention. It is highly advantageous, therefore, to maintain a maximum particle thickness of about 20 mm. In other words, the shortest distance from the periphery of the particle to at least one axis of the particle should not exceed 10 mm. For example, a sphere is limited to a diameter of 20 mm., but a plate-like shape could have two dimensions longer than 20 mm. It is preferable, however, that all dimensions of the particle do not exceed about 20 mm. Even more preferably, the thickness of the particles should be about 4–20 mm.

When the particles are introduced into the partial nitriding zone, it is preferable that the temperature of the initial charging zone be at least 100° C., even more preferably 300–500° C. The weight ratio of $NH_3$ to $B_2O_3$ in the partial nitriding zone is about 1:1 to 3:1; and the particles are subjected to treatment in the partial nitriding zone at 500–900° C. for at least 10 minutes, preferably 40–80 minutes, because longer times do not result in significant increase in the rate of conversion.

The partially nitrided products are then passed into the final nitriding zone wherein the weight ratio of $NH_3$ to $B_2O_3$ is about 8:1 to 12:1, preferably 10:1. As the operating temperature in this zone it is necessary to employ temperatures of above 900° C., preferably 900–1000° C., and the residence is about equal to the residence time in the partial nitriding zone. In some cases the residence times are even less, but in general, the reaction time for the final nitriding zone is equal to about 60–100% of the reaction time in the partial nitriding zone.

In a continuous operation, it is desirable to utilize a countercurrent flow of ammonia to the boron-containing particles, thereby preventing high concentration of by-product water vapor from attacking the formed boron nitride. It is even more preferable to employ a cross flow arrangement wherein the introduction and withdrawal of the gaseous stream is effected in a direction perpendicular to the flow of material. By this latter technique, it is possible to eliminate the by-product water vapor almost as it is formed in the reaction zone, which is, of course, highly desirable to prevent the reaction from reversing, thereby protecting the boron nitride product. In any event, by utilizing an excess of ammonia, the concentration of water vapor in the ammonia should preferably never exceed 60% by weight, even more preferably 20–30% by weight.

After the nitrided material has been formed, it is sometimes preferable to fire the particles at above 1000° C. in the presence of ammonia. The advantage of this step resides in the fact of crystal growth. Thereby the resistance against mineral acids as they are required for washing out the diluent, is increased.

By operating the process of this invention in a continuous manner, it is possible—utilizing the same equipment capacities—to raise the rate of production 2000% (20-fold) over the heretofore known processes.

The equipment that can be utilized to perform the process of this invention is conventional. For example, a vertical kiln, employing a gravity flow moving bed system, is entirely satisfactory, particularly for a cross flow operation. On the other hand, a horizontal rotary kiln fitted with scrapers will also do the job, utilizing countercurrent flow.

With respect to the solid feeders and dischargers that can be employed, conventional belt conveyors, star feeders, screw conveyors, bucket wheel feeders and the like are satisfactory. After the discharger, it is advisable to provide an air lock for preventing any entrained ammonia from permeating into the atmosphere.

The use of a shaft furnace is especially advisable for carrying out a continuous process, because with such a furnace the walls of the reaction zone practically serve only for the guiding of the material and thus any sticking together of the material which may always occur where boric acid is reacted, is reduced to a minimum.

Without further analysis, it is apparent that this invention is described in sufficient detail to enable one skilled in the art to use same. The following preferred specific embodiments, therefore, are presented merely for purposes of illustration, and are not intended to be limitative of the remainder of the specification and appended claims in any way whatsoever.

*Example 1*

5 parts by weight of boric acid ($H_3BO_3$) and 3 parts by weight of precipitated tricalcium phosphate are stirred into a paste with water and formed by means of an extruding press into molded particles having a thickness of 8 mm. and a length of 1–2 cm. The thus obtained particles are dried at 150–200° C.

A vertical furnace, the reaction chamber of which is constituted by a ceramic tube having an inside diameter of 105 mm., is electrically heated to a temperature of 1000° C. The furnace is filled with pre-nitrated material in such a maner that the uppermost part of the charge exhibits a temperature of about 300° C. Ammonia is introduced obliquely through 4 inlet tubes located below the nitrating zone at a rate of 500–600 l./hr. The transportation of the solid material is effected counterflow to the ammonia by force of gravity from above to below; and the discharge is effected by a screw discharger positioned at the lower end of the furnace. Fresh raw material is supplied in the same proportion as the reaction product is drawn off, whereby the temperature of the upper charge is so regulated that it is maintained at the previously adjusted temperature of 300° C. Under these conditions, a temperature range of 500–900° C. extends over a length of 16 cm., the actual nitrating zone being of the same length. The continuous discharge of the product leaving the reaction zone is so adjusted that the product passes through the heating zone in 66 minutes. The discharge rate is controlled by adjusting the r.p.m. of the screw shaft.

The nitration product obtained has a nitrogen content of 13.3% corresponding to 23.6% of 100% boron nitride.

*Example 2*

7.4 kg. of $Na_2B_4O_7 \cdot 10H_2O$ and 5.4 kg. of tricalcium phosphate (ratio $B_2O_3$:calcium phosphate=1:2) are stirred into a paste with water, formed into small cylinders having a diameter of 20 mm. and a length of 3–6 cm. and dried thereafter at 200° C.

The molded particles obtained are filled into the furnace as described in Example 1. Ammonia in introduced from below at a rate of approximately 600 l./hr. The speed of rotation of the discharge screw is set at about 0.3 r.p.m. so that the period for heating the raw material from 500–900° C. is approximately 80 minutes. The height of the supply of material is so chosen that a temperature of 500° is achieved at the upper end. The resultant nitration product has a nitrogen content of 10.4% and a residual boric acid content of about 3.7%.

*Example 3*

6 parts by weight of boric acid ($H_3BO_3$) and 5 parts by weight of precipitated tricalcium phosphate are stirred into a paste with water and formed by means of an extruding press into molded particles having a thickness of 8 mm. and a length of 1–2 cm. The thus obtained particles are dried at 150–200° C.

A vertical furnace the reaction chamber of which is constituted by a ceramic tube having an inner diameter of 105 mm., is electrically heated to a temperature of 1000° C. The furnace is filled with pre-nitrated material in such a manner that at a speed of the ammonia stream of 800–1000 l./hr. the uppermost portion of the charge exhibits a temperature of about 300° C. Ammonia is introduced obliquely through 4 inlet tubes situated below the nitrating zone.

The transportation of the material is effected in counterflow to the ammonia by force of gravity from above to below, and the discharge is effected by a screw discharger positioned at the lower end of the furnace. Fresh raw material is supplied in the same proportion as the reaction product is drawn off, whereby the temperature is so regulated that it is maintained at the previously adjusted temperature of 300° C. Under these conditions, a temperature range of about 500–900° C. extends over a length of 16 cm., the actual nitrating zone being of the same length. The continuous discharge of the product leaving the reaction zone is so adjusted that the product passes through the heating zone in 20 minutes. The discharge rate is controlled by the r.p.m. of the screw shaft.

The nitration product obtained has a nitrogen content of 14.5% corresponding to 25.8% of 100% boron nitride. The residual content of boric acid is only 0.7%.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably and intended to be within the full range of equivalence of the following claims.

What is claimed is:

1. A process for the production of boron nitride, which process comprises the steps of:
    (1) introducing particles having a thickness up to 1–20 mm., said particles comprising a substantially homogeneous intimate mixture of an oxygen-containing boron compound selected from the group consisting of $B_2O_3$, $H_3BO_3$, alkali metal borates, and alkaline earth metal borates, and a solid, inert, diluent melting above about 1300° C., having a high volume to weight ratio of above about 0.2 g./ml., and capable of being separated from boron nitride by washing techniques, said boron compound, expressed as $B_2O_3$, and diluent being present in a weight ratio of 1:2 to 1:1 respectively, to a partial nitriding zone in contact with ammonia for 10–80 minutes at 500–900° C., the weight ratio of $NH_3$ to $B_2O_3$ being about 1:1 to 3:1; and
    (2) introducing the resultant particles from step (1) into a final nitriding zone in contact with ammonia at above 900° C. for a period of time approximately 60–100% of the contact time employed in step (1), the weight ratio of $NH_3$ to $B_2O_3$ being about 8:1 to 12:1.

2. The process of claim 1 wherein both steps are accomplished in a continuous manner.

3. The process of claim 2 wherein the inert, high melting diluent is tricalcium phosphate.

4. The process of claim 1 wherein the contact time in step (1) is 40–80 minutes.

5. The process of claim 2 wherein the particles and ammonia are passed countercurrently to one another.

6. The process of claim 2 wherein the ammonia is passed through a bed of particles in a direction perpendicular to the flow of the bed of particles, thereby rapidly withdrawing any formed water vapor.

7. The process of claim 1 wherein the particles have a thickness of 4–20 mm.

8. The process of claim 1 further comprising the step of firing the resultant nitrided mass from step (2) at a temperature above 1000° C.

9. A process for the production of boron nitride, which process comprises the steps of:
 (1) mixing an oxygen-containing boron compound selected from the group consisting of $B_2O_3$, $H_3BO_3$, alkali metal borates, and alkaline earth metal borates with tricalcium phosphate and an inert liquid, said boron compound expressed as $B_2O_3$ and tricalcium phosphate being present in a weight ratio of 1:2 to 1:1 respectively, and said inert liquid being present in a sufficient quantity to form a mixture having a pasty consistency;
 (2) molding said pasty mixture into particles having a thickness of 4–20 mm.;
 (3) drying said particles to remove the inert liquid therefrom;
 (4) passing said dried particles continuously through a partial nitriding zone in countercurrent contact with ammonia at 500–900° C. for 40–80 minutes, the weight ratio of $NH_3$ to $B_2O_3$ being about 1:1 to 3:1; and
 (5) passing the resultant partially nitrided product from step (4) through a final nitriding zone in countercurrent contact with ammonia at above 900° C. for a period of time approximately equal to the contact time in step (4), the weight ratio of $NH_3$ to $B_2O_3$ being about 8:1 to 12:1.

10. The process of claim 1, wherein the solid diluent is selected from the group consisting of tricalcium phosphate, $MgF_2$, $Mg_2P_2O_7$, $CaF_2$, $Ba_3(PO_4)_2$, and $BaF_2$.

References Cited by the Examiner

UNITED STATES PATENTS

| 2,808,314 | 10/57 | Taylor | 23—191 |
| 2,888,325 | 5/59 | Taylor | 23—191 |

FOREIGN PATENTS

| 581,926 | 8/59 | Canada. |
| 1,096,884 | 1/61 | Germany. |

MAURICE A. BRINDISI, *Primary Examiner.*